United States Patent [19]

Mossey

[11] 4,326,804
[45] Apr. 27, 1982

[54] APPARATUS AND METHOD FOR OPTICAL CLEARANCE DETERMINATION

[75] Inventor: Paul W. Mossey, Greenhills, Ohio

[73] Assignee: General Electric Company, Cincinnati, Ohio

[21] Appl. No.: 120,408

[22] Filed: Feb. 11, 1980

[51] Int. Cl.³ .............................................. G01B 11/14
[52] U.S. Cl. .................................. 356/375; 250/224; 356/23; 415/118
[58] Field of Search .................. 356/23, 375, 381, 376, 356/1, 345, 346; 415/118; 250/224

[56] References Cited

U.S. PATENT DOCUMENTS

| | | | |
|---|---|---|---|
| 3,245,306 | 4/1966 | Potter et al. | 356/446 |
| 3,565,531 | 2/1971 | Kane et al. | 356/381 |
| 3,667,846 | 6/1972 | Naner et al. | 356/376 |
| 4,180,329 | 12/1979 | Hidebrand | 356/23 |
| 4,198,164 | 4/1980 | Cantor | 356/375 |

FOREIGN PATENT DOCUMENTS

| | | |
|---|---|---|
| 1062967 | 3/1967 | United Kingdom . |
| 1484996 | 9/1977 | United Kingdom . |
| 1528132 | 10/1978 | United Kingdom . |
| 1533265 | 11/1978 | United Kingdom . |
| 2041690 | 9/1980 | United Kingdom . |

OTHER PUBLICATIONS

U.S. Army Air Mobility Research and Development Laboratory; "Design, Fabrication and Demonstration of a Miniaturized Tip Clearance Measuring Device", USAAMRDL-TR-74-67, Sep. 1974, pp. 10-13.

*Primary Examiner*—R. A. Rosenberger
*Attorney, Agent, or Firm*—Carl L. Silverman; Derek P. Lawrence

[57] ABSTRACT

Clearance determination is made between an edge of a translating member, e.g., a rotating blade member, and a relatively stationary second member, e.g., a shroud. In one form, an optical probe is provided for directing light from a light source to the edge and for collecting light scattered back from the edge. The probe includes first and second adjacent channels, optically separated by an opaque baffle. Probe output means and signal processing means are provided for developing a stored or displayed representation of the instantaneous clearance between each of a plurality of rotating blades and a stationary member, such as the turbine blade shroud. The probe may employ a continuous or intermittent light source. Synchronization techniques are provided for use with the intermittent light source wherein the light source is turned on only when needed to make the appropriate clearance determination. Other embodiments are disclosed.

12 Claims, 9 Drawing Figures

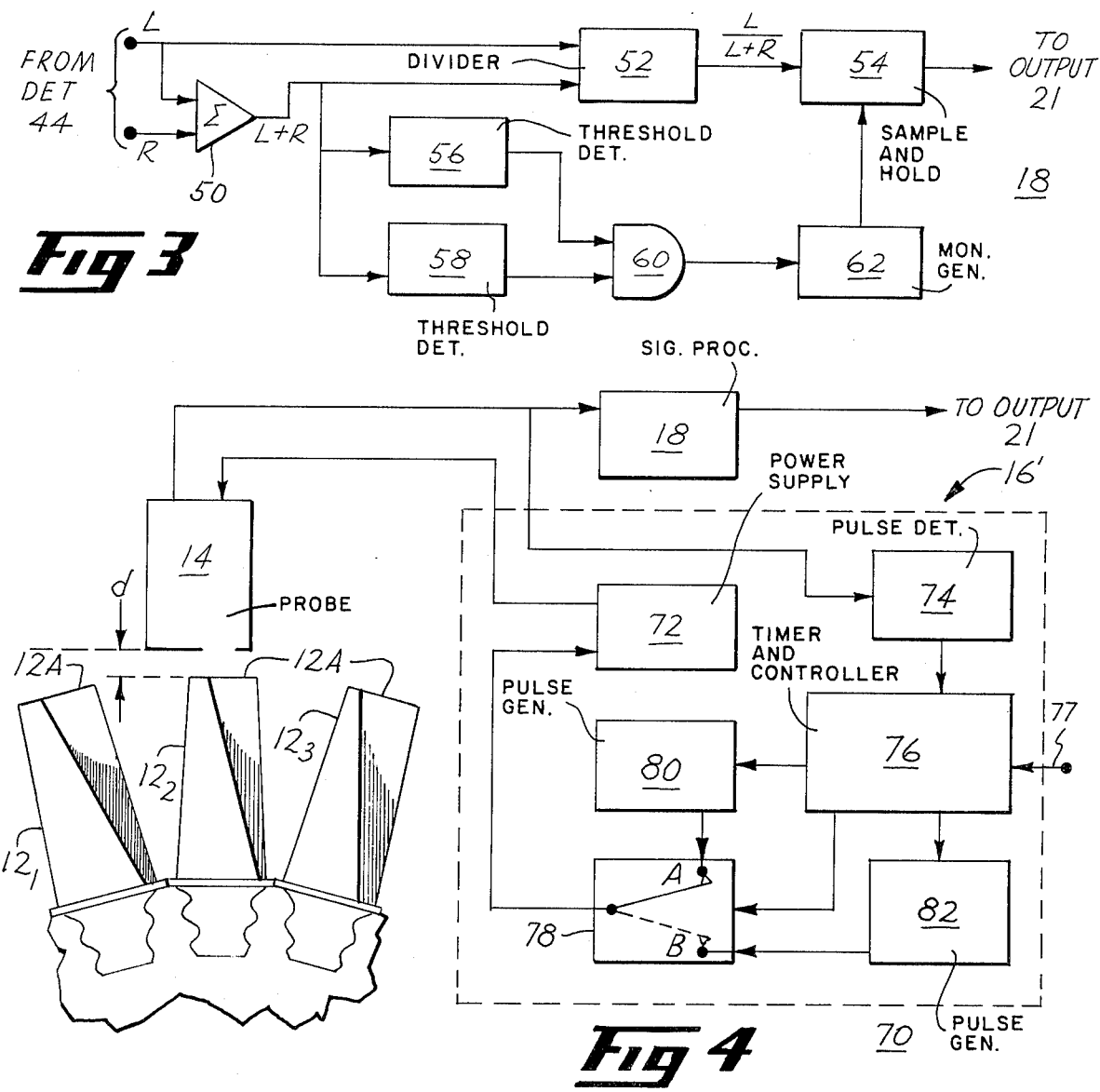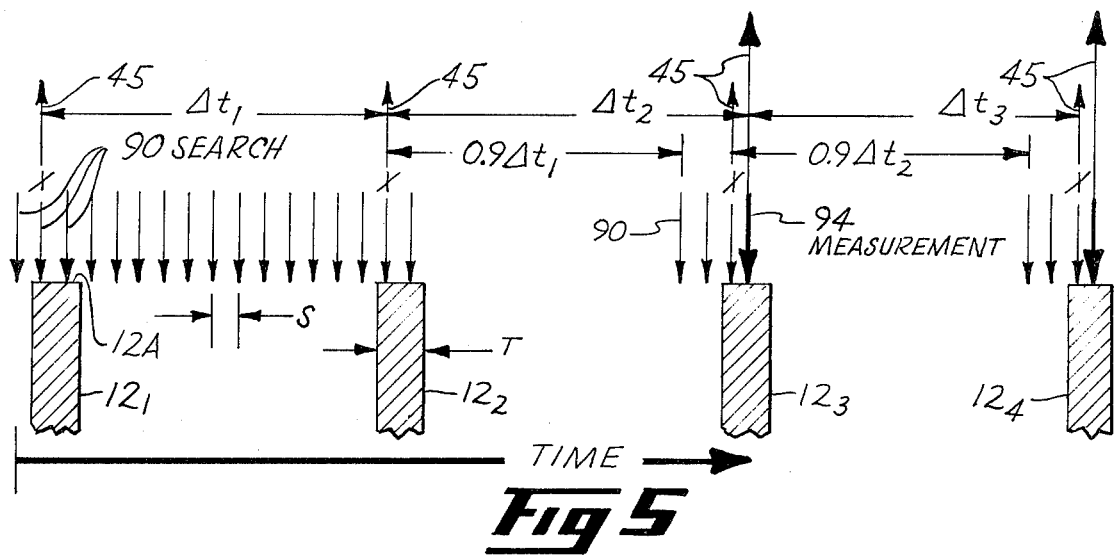

APPARATUS AND METHOD FOR OPTICAL CLEARANCE DETERMINATION

The invention herein described was made in the course of or under a contract, or a subcontract thereunder, with the United States Department of the Air Force.

BACKGROUND OF THE INVENTION

The present invention relates to apparatus and techniques for optically determining the clearance between at least one translating member and a relatively stationary second member, and more particularly, to such clearance determination between the radial edge of a rotating blade member and a shroud in a gas turbine engine.

Modern aircraft gas turbine engines typically employ high pressure ratio compressors and turbine stages. This engine design reduces weight and improves overall efficiency, but is more sensitive to the blade tip-to-shroud clearance. In this connection, unnecessarily large clearances cause excessive leakage and also tend to induce aerodynamic losses within and downstream of the particular blade tip-to-shroud position. Accordingly, it is well known that significant advantages in engine performance and engine life extension result when a clearance control technique is implemented. In addition, in the development of an aircraft gas turbine engine, a designer needs to identify the effect of clearance on performance and life, and hence, needs running clearance measurements during developmental engine testing.

Various clearance measuring techniques have been employed in the past and have had some success. However, each of the known measuring techniques has several disadvantages associated with its use. For example, one measuring technique employs blade rub pins in the form of small metal projections mounted in the shroud. These rub pins wear away upon blade contact, and hence, the engine must be disassembled in order to find the final pin length. Also, such rub pins only show the minimum clearance encountered such that the designer is not able to discern the time or particular engine parameters when the minimum clearance event occurred. In view of the foregoing, the use of blade rub pins is not considered practical in an operating gas turbine engine of the type which employs clearance control techniques. Another clearance measuring technique employs high energy X-rays. However, this technique involves undesirable accuracy limitations and is usable generally only on shrouded blades. Further, use of such X-rays requires specially equipped engine test sites. Another clearance measuring technique employs touch probes for measuring the clearance to the highest blade, i.e., the blade having the minimum clearance. Such touch probes cannot measure rotor orbiting, i.e., the amount of out-of-roundness or out-of-centerness, and the touch probes cannot measure clearance changes during fast engine transients. Capacitance clearance measuring techniques have also been employed wherein a probe senses capacitance which is representative of blade tip clearance. However, the accuracy of such capacitance clearance techniques is detrimentally affected by several mechanisms. For example, any change in stray capacitances or in the blade tip shape, e.g., dirt buildup on blade sides, formation of melt, affects the capacitance sensed. Similarly, normal manufacturing tolerances with respect to individual blade tip thickness also affect the technique's accuracy.

Another clearance measuring technique employs optical devices, such as optical probes, and triangulation to determine blade tip location. However, a difficulty with one such optical measuring technique is due to the conventional optical probe typically employed. Such optical probes are generally characterized by undesirably high internal light reflections within the probe. Also, these optical measuring techniques have heretofore exhibited limited responsiveness and accuracy. For example, one such optical measuring technique employs closed circuit television, resulting in an inability to determine individual blade clearances in a rapidly rotating blade structure.

Accordingly, it is a general object of this invention to provide improved optical apparatus and techniques for determining the clearance between the radial edge of at least one rotating blade member and a relatively stationary second member.

Another object of the present invention is to provide such apparatus and techniques wherein high internal light reflections within the probe are reduced.

Another object of the present invention is to provide such apparatus and techniques capable of developing a substantially instantaneous representation of the clearance between the radial edge and the second member.

SUMMARY OF THE INVENTION

In carrying out one form of my invention, I provide apparatus for optically determining the clearance between an edge of at least one translating member and a relatively stationary second member. The apparatus includes probe means disposed in relatively fixed position with respect to the stationary second member for directing light from a light source to the edge and for collecting light scattered back from the edge. The probe means includes first channel means for directing the light to the edge and second channel means generally adjacent to the first channel means for collecting the light scattered back from the edge wherein the first and second channel means are substantially optically isolated from each other. The probe means includes probe output means responsive to the light scattered back for developing a probe output signal. Signal processing means is coupled to the probe output means for receiving the probe output signal and developing an intermediate electrical signal substantially representative of the instantaneous clearance between the edge and the second member. Means responsive to the intermediate signal is provided to provide a representation of the clearance. Other forms of my invention are provided.

BRIEF DESCRIPTION OF THE DRAWINGS

For a better understanding of the invention, reference may be had to the following description, taken in conjunction with the accompanying drawings, wherein:

FIG. 3 is a functional block diagram of one form of signal processing means of the present invention suitable for use in the apparatus of FIG. 1.

FIG. 4 is a schematic and functional block representation of another form of optical clearance measuring apparatus of the present invention.

FIG. 5 is a timing and control diagram depicting one technique for operating the apparatus of FIG. 4 with an intermittent light source.

DETAILED DESCRIPTION OF THE INVENTION

Figure 1:
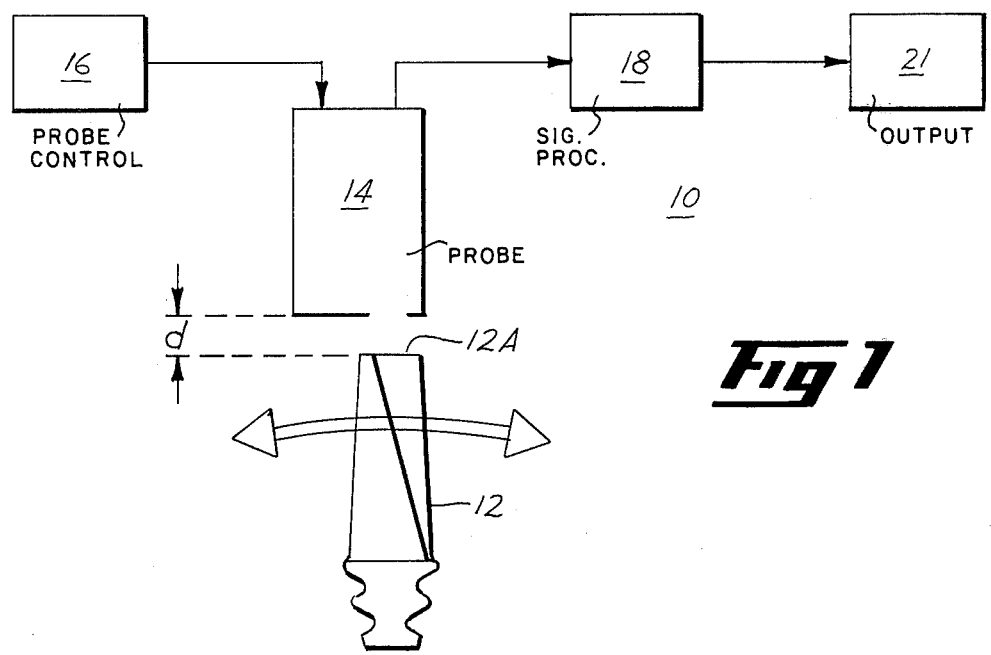
FIG. 1 is a schematic representation depicting one form of optical clearance measuring apparatus to which Applicant's invention relates.

Referring initially to FIG. 1, one form of clearance measuring apparatus to which Applicant's invention relates is generally designated 10. The apparatus 10 is shown in connection with a rotating blade member 12 which may, for example, represent one blade of a multi-bladed turbine rotor. The blade 12 includes a radial outer edge 12A which is rotatable in the direction shown by the arrow. The designation d is employed to represent the clearance between the radial outer edge 12A and a relatively stationary member which may, for example, be a turbine blade shroud (not shown). The position of this relatively stationary member is shown by the dashed line. Optical probe means 14 is disposed in relatively fixed position with respect to the stationary member.

The probe means 14 is controlled by probe control means 16 and functions to direct light from a light source (not shown in FIG. 1) to the radial edge 12A and to collect light scattered back from the radial edge 12A. As will be discussed more fully later, the light scattered back from the radial edge 12A to probe means 14 contains information relating to the clearance d between the radial edge 12A and the relatively stationary member. The probe means 14 develops an output signal representative of the clearance d between the radial edge 12A and the stationary member. This probe output signal is directed to signal processing means 18 which further processes the probe output signal and develops an intermediate signal representative of the clearance d between the radial edge 12A and the stationary member. The intermediate signal is directed to output means 21 which may, for example, comprise display means, e.g., an oscilloscope, or storage means. The output means 21 is typically repeatedly triggered at each revolution of the blade system involved. Such triggering may be accomplished by known techniques such as the use of a magnetic pick-up device. The output means 21 thus provides a visual and/or retrievable representation of the clearance d.

Figure 2:
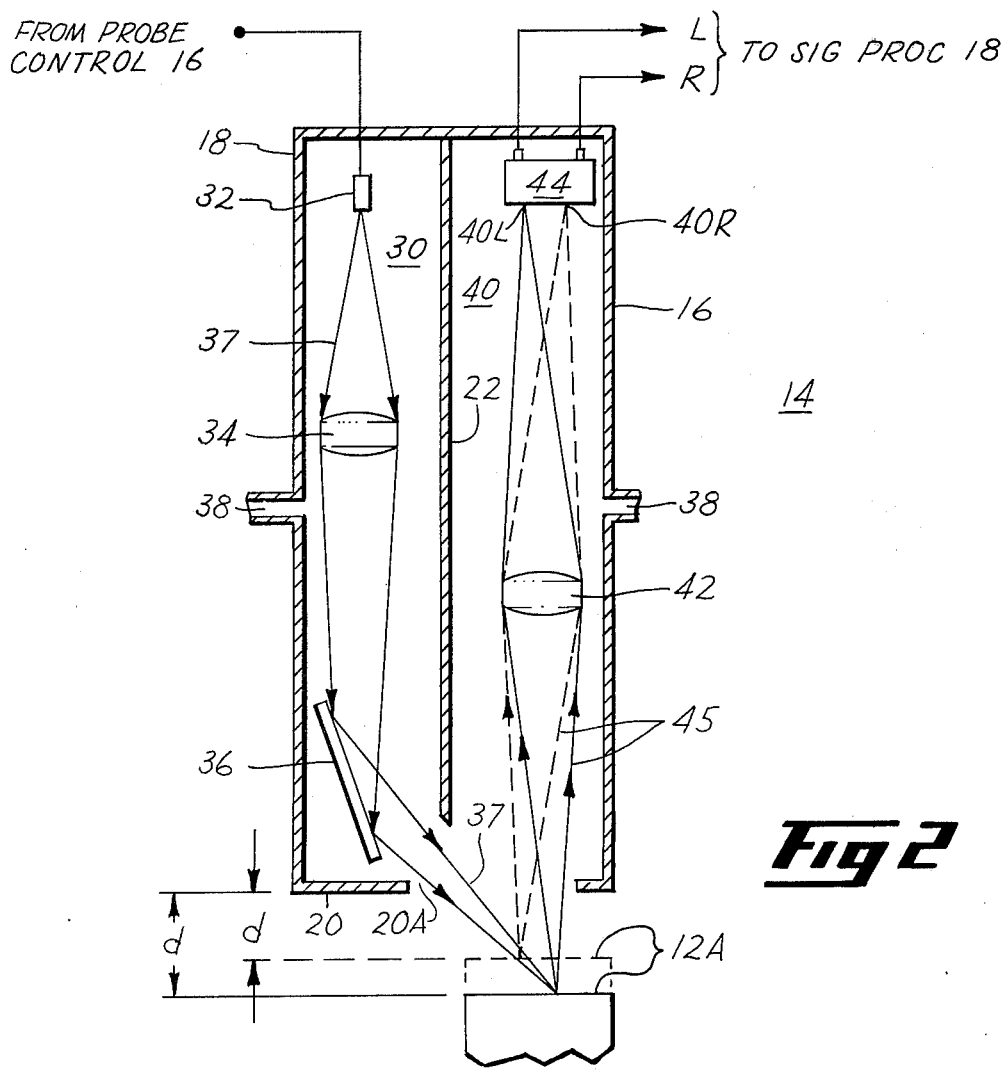
FIG. 2 is a schematic representation of one form of optical probe means of the present invention suitable for use in the apparatus of FIG. 1.

Referring now to FIG. 2, one form of the optical probe means 14 of FIG. 1 will be more particularly described. The optical probe means 14 includes a housing 16 which may, for example, be tubular in shape. The housing 16 is preferably of a rugged material, such as stainless steel. The housing includes opposing ends 18 and 20, with end 20 having an end opening 20A. Baffle means 22, of an opaque material such as stainless steel, forms, and optically separates, first and second generally adjacent channels 30, 40, respectively. Channels 30 and 40 are disposed in relatively fixed position with respect to each other. Channel 30 includes a light source 32, preferably a laser light source, adjacent end 18. Spaced from the light source 32 in a direction toward the other end 20, is an input lens 34. A mirror 36 is spaced from the lens 34 and is positioned near the end 20. The mirror 36 is positioned to receive light transmitted from the lens 34 and to direct such light onto the radial edge 12A of the rotating blade 12. Referring now to the second channel 40 formed by the baffle 22, an output lens 42 is positioned to receive light which is scattered back from the radial edge 12A of the blade 12. Probe output means 44 is positioned adjacent the end 18 to receive light transmitted from the output lens 42. The probe output means 44 may, for example, comprise a spot position detector of the type in which light incident on the surface of the probe output means 44 causes the spot position detector output to develop an output signal representative of the point of impact of the incident light. For example, as shown in FIG. 2, and as will be more fully understood later, the spot position detector 44 develops an electrical output signal which is a two-component determinable combination of magnitudes representative of pure left position (L) and pure right position (R).

The optical probe means 14 can be better understood by referring to its operation. In this connection, referring to channel 30, the light source 32 is shown emitting light in the form of rays 37. Such rays 37 illuminate the input lens 34. The input lens 34 focuses the light rays 37 toward the mirror 36. The mirror 36 directs the light output therefrom toward and through opening 20A in the form of a relatively fixed position narrow, e.g., typically about 1 to 3 mils in width in the plane of measurement, input beam 37. For purposes of illustration, in FIG. 2, two rotating blade members 12, having radial edges 12A, are partially shown. More particularly, shown in solid lines is a relatively low radial edge 12A and shown in dashed lines is a relatively high radial edge 12A.

Referring now to the relatively low blade edge 12A, the fixed position input beam 37 is reflected by low radial edge 12A, forming reflected light rays 45. The reflected light rays 45 are then focused by the output lens 42 onto the spot position detector 44. The spot detector 44 converts the position of the focused spot thereon to a two-component (left and right) signal which is further processed in a manner which will be discussed more fully later. It is to be noted that the output lens 42 focuses substantially all light it receives from the relatively low radial edge 12A to point of impact location 40L on spot position detector 44. The operation of the optical probe means 14 will now be described in connection with relatively high radial edge 12A (shown in dashed lines). The reflection from relatively high radial edge 12A again creates reflected light rays 45 which are focused by the output lens 42 onto the spot position detector 44. However, in the case of reflected light rays 45 from relatively high radial edge 12A, the point of impact on the spot position detector 44 is location 40R. As in the case of relatively low radial edge 12A, substantially all reflected light which reaches the output lens 42 from relatively high radial edge 12A is focused at the appropriate location (40R) on the spot detector 44. As is apparent, the particular point of impact of the output beam 45 on the spot position detector 44 is determined by the clearance d between the end 20 of the probe means 14 and the radial edge 12A. More particularly, the point of impact of the output beam 45 on the spot detector 44 moves in an determinable proportional relationship to the clearance d.

The probe means 14 may, for example, be employed as an attachment to a relatively stationary gas turbine engine shroud wherein the distance measured is the clearance between a rotating blade member and a shroud surface. It is generally preferable to recess the end 20 of the probe 14 behind the shroud surface and to compensate for this additional distance by appropriate adjustments. For such applications, the housing 16 may include a plurality of fittings 38 which admit purged air to each side of the probe 14, and to each channel 30, 40. The purpose of the fittings 38 is to maintain the probe optics in a clean condition. In a gas turbine engine, such purged air is generally taken through bleed lines (partially shown) from the engine's compressor. The purged air is typically cooled and filtered before admitting the probe 14. After flowing through the probe 14, the purged air may be discharged into the engine.

An advantage of the probe means 14 of FIG. 2 is that no prism is used. The probe means 14 employs a mirror 36 which may be made of glass or metal and which is more rugged and less costly than a prism. In addition, the use of separate input and output lenses 34, 42, respectively, completely eliminates undesirable internal light reflections. As a result, the output light beam 45 received by the spot position detector 44 comes only from the reflected rays 45, allowing use of an efficient high-speed detector for converting the position of the spot of light to a proportional electrical signal.

Preferably, the optical probe means 14 of FIG. 2 includes a light source 32 such as the injection laser diode commercially available from Laser Diode Laboratories under the designation LD series. The lens 34 is preferably of fused silica or sapphire. The mirror 20 is preferably a high temperature resistant material, such as well known alloys of platinum and rhodium. The spot position detector 44 preferably comprises a rugged silicon junction, solid state miniature device, such as the one designated PIN SC/4D, commercially available from United Detector Technology.

Referring now to FIG. 3, one form of signal processing means 18 suitable for use in the apparatus 10 of FIG. 1 will now be described. A summation device 50 receives the two-component (L+R) output signal of the spot position detector 44 of FIG. 2. The output signal of summation device 50 thus represents the sum of the two components: L+R. The output signals L and (L+R) of the detector 44 and the summation device 50, respectively, are coupled to a high speed divider 52 which develops an output signal representative of L/(L+R), and hence, representative of the point of impact on the spot position detector 44 of FIG. 2. As noted previously, this point of impact information is employed to determine the clearance d. For many applications, it is preferable to employ threshold detectors 56, 58 for respectively establishing minimum and maximum threshold levels for the L+R output signal of the summation device 50. The outputs of the threshold detectors 56, 58 may be coupled to AND gate 60 and then to monostable generator 62. The output of monostable generator 62 may be coupled to sample and hold means 54, as in FIG. 3, such that the output signal of the divider 52, representative of the clearance d, is accepted only when the appropriate threshold conditions are met. The circuit elements shown in FIG. 3 are well known to those skilled in the art and are commercially available.

It is to be appreciated that the probe light source 32 may be operated continuously or intermittently. If the light source 32 is operated continuously, the foregoing description remains applicable. However, if the light source 32 is operated intermittently, synchronization means must be provided for ensuring the presence of the input beam and the particular radial outer edge 12A at the time at which the clearance d between the radial edge 12A and the stationary member is to be determined.

Referring now to FIG. 4, one such apparatus, employing an intermittent light source, is generally designated 70. As noted above, the apparatus 70 is similar to the apparatus 10 of FIG. 1 but further includes the needed synchronization means. Accordingly, whenever possible, like reference numerals have been employed to represent like elements. The apparatus 70 includes optical probe means 14, signal processing means 18 and output means 21 for use in determining the clearance d between: the plurality of blades 12, with radial outer edges 12A; and, a stationary member, shown in dashed lines.

The apparatus 70 further includes modified probe control and synchronization means 16'. The control and synchronization means 16' includes a switchable power supply 72 for the intermittent light source 32 (not shown) which may, for example, comprise an injection laser diode. The output of the probe 14 is directed to signal processing means 18, such as the one shown in FIGS. 1 and 3, and is also directed to pulse detector means 74. The output of pulse detector means 74 is coupled to timer and controller means 76. Timer and controller means 76 develops at least three outputs. One output is directed to switch means 78 and functions to cause switch means 78 to transit in a predetermined manner between input connections A and B. A second output of timer and controller means 76 is directed to pulse generator 80 and then to input A of switch 78. A third output of timer and controller means 76 is directed toward pulse generator 82 and then to input connection B. Pulse generators 80 and 82 are substantially the same except that, as will be more fully understood later, pulse generator 82 develops a relatively low power, short duration pulse as compared to the pulse generated by pulse generator 80. The pulses developed by pulse generator 80 may be referred to as MEASUREMENT PULSES while the pulses developed by pulse generator 82 may be referred to as SEARCH PULSES.

The operation of the optical clearance measuring apparatus 70 of FIG. 4 can be better understood by referring also to the timing and control diagram of FIG. 5. When the turbine blades 12 are moving past the probe 14, the timer and controller means 76 is activated through, for example, manual start means 77. The activation of the timer and controller means 76 places the switch means 78 into position B and couples the controller means 76 with pulse generator 82. The pulse generator 82 then generates a brief, relatively low level electrical pulse that is conducted through the switch 78 to the switchable power supply 72 and finally into the probe 14, producing a brief light source pulse. Such low level, short duration light pulses are shown in the timing and control diagram of FIG. 5 and designated 90. These light pulses 90 are closely spaced in time such that about 40 to 100 pulses occur during the time that it takes for the leading edge of one blade $12_1$ and the leading edge of a second blade $12_2$ to pass a fixed point in space. At each time in which a leading edge 12A passes under the probe 14, light rays 45 are reflected and returned to the spot position detector 44 in the probe means 14, as in FIG. 2. The resulting electrical outputs of spot position detector 44 are then received by the pulse detector 74 which develops a pulse detector 74 output signal representative of such position detector 44 output, and hence, representative of the reflected light 45. This output signal of the pulse detector 74 initiates a first timer function within the timer and controller means 76. The next blade leading tip to pass under the probe 14 also produces reflected rays 45 whose presence are also detected by pulse detector 74. This second reflected ray 45 and second pulse detector output 74 functions to stop the first timing function while starting a second timing function in the timer and controller means 76. The elapsed time between such reflected light rays 45, relating to blades $12_1$ and $12_2$, is shown in FIG. 5 as $\Delta t_1$. This time, $\Delta t_1$, is used by the timer and controller means 76 to automatically calculate a time less than $\Delta t_1$, for example, equal to 0.9 $\Delta t_1$, during which the probe light source is not pulsed on, but is off.

At the end of this time period, 0.9 $\Delta t_1$, when the probe light source has been off, pulse generator 82 is again activated, causing the generation of another series of low power, short duration pulses 90, shown in FIG. 5. These low power, short duration pulses 90, SEARCH PULSES, are continued until the next blade $12_3$ leading tip causes another light ray 45 to be reflected back to the probe 14, and hence, to pulse detector 74. The pulse detector 74 develops a third pulse detector output which functions to stop the second timing function in the timer and controller means 76. The elapsed time between reflected rays 45, relating to blades $12_2$ and $12_3$, is shown in FIG. 5 as $\Delta t_2$. Within a brief time, for example, less than about $10^{-6}$ sec, while this third successive blade $12_3$ and blade edge 12A is still under the probe 14, the timer and controller 76 causes the switch 78 to move to position A. This activates the pulse generator 80, developing a higher power, longer duration pulse 94. The high power, relatively long duration pulse 94 causes a high power, relatively long duration light pulse, MEASUREMENT PULSE, to be provided by the intermittent light source (not shown) in the probe 14. The relatively higher energy light pulse causes a relatively higher energy reflected ray 45 to be developed, such that the spot position detector 44 of the probe 14 may accurately sense the true spot position with sufficient signal to noise ratio.

As described above, at the point in time in which the third blade $12_3$ tip passed under the probe 14 and the second timing function was stopped, a second timer was activated in order to measure the time interval $\Delta t_2$. The second interval, $\Delta t_2$, is then used to automatically calculate a further interval less than $\Delta t_2$, for example 0.9 $\Delta t_2$. The second timer interval, 0.9 $\Delta t_2$, is again used to stop all light pulse emission as before. However, if the rotational velocity of the turbine blades 12 has changed, this new interval, $\Delta t_2$, will be different from $\Delta t_1$ by a function of such change. Thus, the clearance measurement apparatus and techniques shown in FIGS. 4 and 5 is continuously updated to the most recent interblade passage time. Accordingly, the synchronization means is updated to the most recent interblade passage time and will follow substantially instantaneously any usual engine speed change, without missing any blade clearance measurements.

In the use of the clearance measuring apparatus and techniques of FIGS. 4 and 5, it is preferable to space the SEARCH PULSES 90 of FIG. 5 sufficiently close in time, as in FIG. 5, such that the thickness T of the blades 12 is greater than the spacing S between successive SEARCH PULSES 90. Also, because the first reflected ray 45 from the third successive blade $12_3$ is derived from a SEARCH PULSE 90, it is desirable to provide means for discriminating between an input derived from a SEARCH PULSE 90 as compared to an input derived from the MEASUREMENT PULSE 94. As noted previously, the MEASUREMENT PULSE 94 produces a highly desirable, relatively high energy-reflected ray 45, suitable for accurately determining the clearance d. Conventional means by which this discrimination can be accomplished include the use of an appropriate minimum threshold setting in the signal processing means 18 or through the use of an appropriate time delay in the signal processing means 18.

An advantage of the intermittent light source operation shown in FIGS. 4 and 5 is that such apparatus allows the use of intermittent light sources having very high conversion efficiency, such as the pulsed-injection laser diode. This device has a maximum duty cycle due to internal heat dissipation limits, where duty cycle is defined as a ratio of time that the laser diode current is on, divided by the time on, plus time off. For example, in one commercially available laser diode, i.e., the LD 60 series of Laser Diode Laboratories, at full input current to the laser diode, the manufacturer specifies that the duty cycle must not exceed 0.001. Thus, in the apparatus 70, shown and discussed in FIGS. 4 and 5, the average power dissipation is substantially reduced because the laser diode is not pulsed for the 0.09 $\Delta t$ intervals. This type of intermittent operation keeps the duty cycle at a reduced level and generally extends the life of the light source.

It is to be further appreciated that the intermittent light source apparatus and technique of the present invention is not limited to a particular kind of light source but will function with any pulse mode light source. Exemplary intermittent light sources include gas discharge lamps, including xenon and mercury, and pulsed lasers of any kind, including gas, liquid and solid rod types. Further, the apparatus and technique are applicable to the measurement of clearance or distances to any translating target such as a vibrating surface or object. It is to be appreciated, however, that for vibratory objects that stay in front of the probe 14 while vibrating, SEARCH PULSES may not be needed and the MEASURE PULSE generator 82 may be manually set to operate a pulse train continuously through the switch 78.

Exemplary devices and circuitry for the clearance measuring apparatus 70 of FIG. 4 include the following: the power supply for the intermittent laser diode 32 may comprise LP series, commercially available from Laser Diode Laboratories; the pulse detector 74 may comprise model SN72311, commercially available from Texas Instruments; the timer and controller means 76 may comprise models SN74123 and SN7400 circuits, commercially available from Texas Instruments; the measure mode pulse generator 80 and search mode pulse generator 82 may comprise model SN74121, commercially available from Texas Instruments; the switch 78 may comprise model AD7510 field effect transistor switch, commercially available from Analog Devices, Inc.

Fiber optic techniques can also be employed in connection with the practice of the present invention. For example, referring now to FIG. 6, a portion of one form of Applicant's invention, utilizing fiber optics, is generally designated 100. The apparatus 100 again includes optical probe 14', similar in many respects to the optical probe 14 previously discussed. However, optical probe 14' of FIG. 6 employs an optical fiber 102 to communicate light from a light source 104 to the input channel of the probe 14. Also, light probe 14' includes probe output means 106 in the form of a bundle of fiber optic cables, for example, 106A, 106B, 106C, 106D. The fiber optic bundle 106A-D functions to replace the spot position detector 44 previously discussed. The fiber optic bundle 106A-D is coupled to signal processing means 108 which receives the light output from the probe 14 and develops an intermediate electrical signal which is representative of the instantaneous clearance between the appropriate radial edge and stationary member, as discussed previously. The output of the signal processing means 108 is then directed to output means 110 which may, for example, be in the form of a display oscilloscope. As before, the display oscilloscope 110 may be triggered at a one per revolution rate thereby developing a representation showing the clearance for each blade during each revolution.

Figure 6:
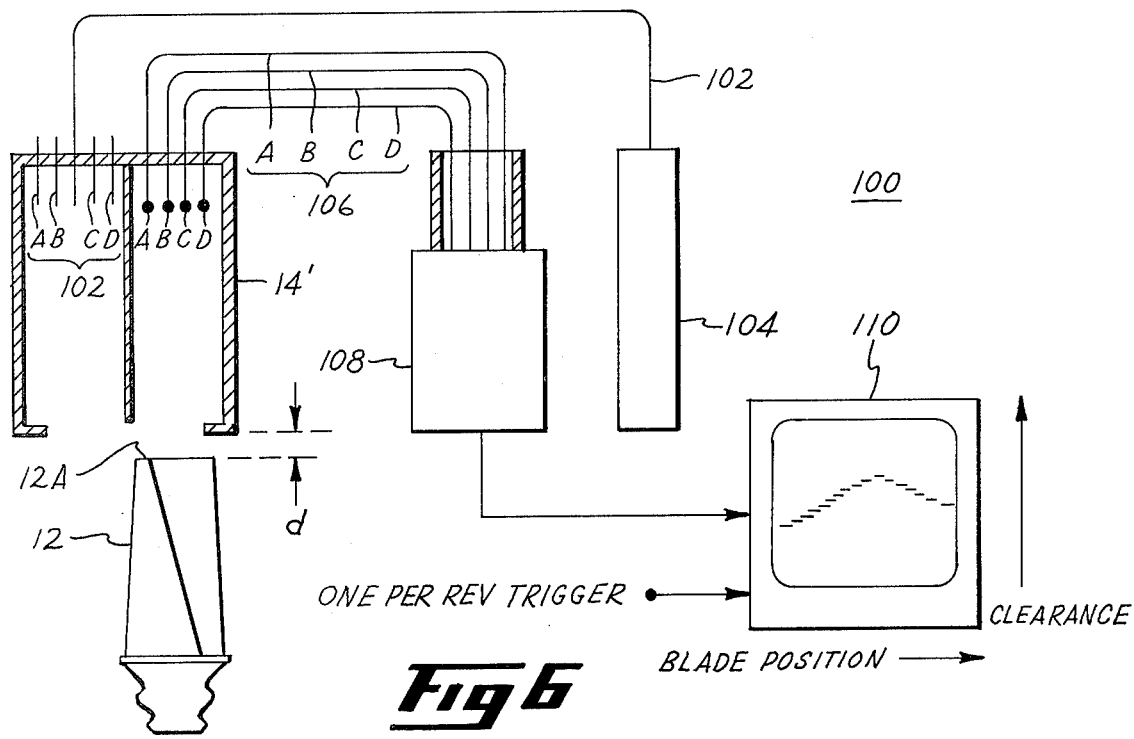
FIG. 6 is a schematic representation of another form of optical clearance measuring apparatus of the present invention.
Figure 7:
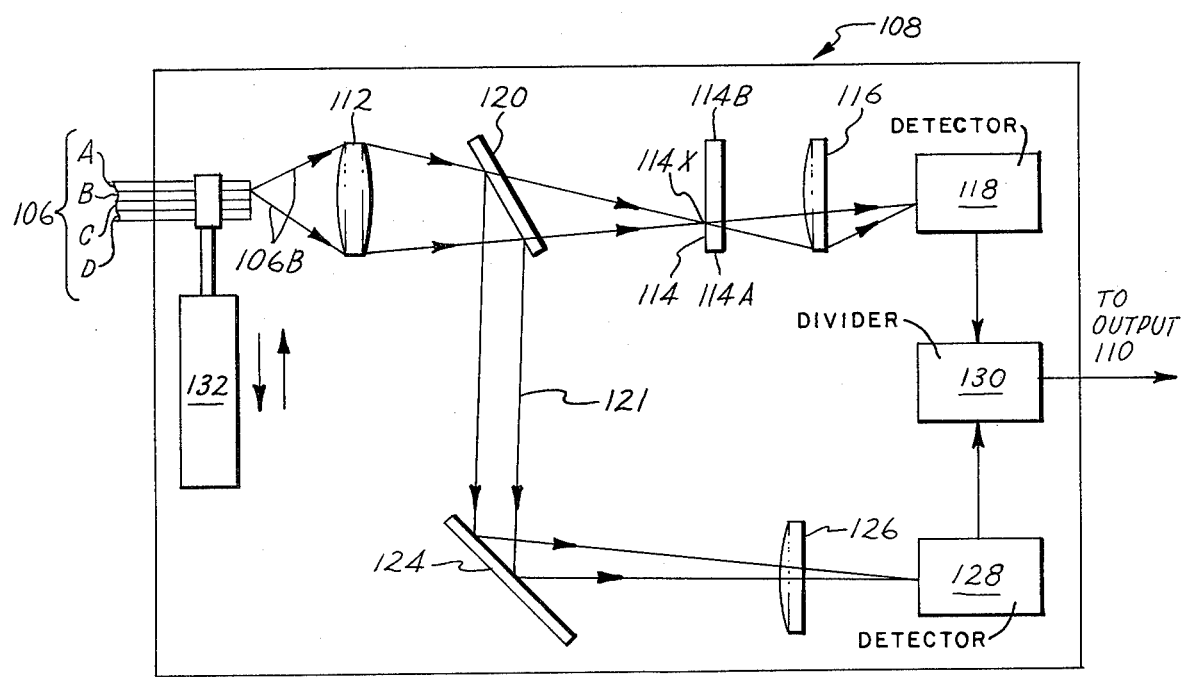
FIG. 7 is a schematic representation of one form of signal processing means suitable for use in the apparatus of FIG. 6.

Referring now to FIG. 7, one form of signal processing means 108 useful in connection with the apparatus 100 of FIG. 6 will now be discussed. The output fiber optics 106A-D is directed toward lens 112 which functions to image the light output from such fiber optics 106A-D onto graded filter 114. The graded filter 114 is provided with a light attenuating coating which varies in attenuation in one direction only, from clear, i.e., unattenuating, at edge 114A, to nearly opaque at the other end 114B. The light through graded filter 114 which is not attenuated is directed toward condensing lens 116 and then to a light detecting means 118 which may be a commercially available photomultiplier tube. Photomultiplier tubes are generally preferred in such apparatus as such photomultiplier tubes exhibit a high sensitivity to commonly employed laser light colors and are quickly responsive to brief bursts of light. Disposed between the lens 112 and the graded filter 114 is a beam splitter 120 which transmits half of the light incident and reflects the remaining half. The reflected light portion 121 is directed toward a mirror 124, then onto a second condensing lens 126, and finally to a second photomultiplier tube 128. The output of photomultiplier tubes 118 and 128 are then directed to a high speed divider 130. The output of the high speed divider 130 represents the output of the signal processing means 108 of FIG. 6, which output is directed to the display means 110. The elements of the signal processing means 108 are conventional and commercially available.

The operation of the signal processing means 108 of FIG. 6 and 7 will now be described. A spot position at, for example, fiber optic cable 106B, is imaged to a unique position 114X on the graded filter 114. At position 114X, the graded filter 114 has a unique attenuation characteristic. Consequently, the output of photomultiplier tube 118 is a function of both the original light intensity at the position 106B as well as the attenuation unique to position 114X on the filter 114. However, as no graded filter is used in the reference path 121, the output of the reference photomultiplier 128 is dependent only upon the original light intensity at position 106B. Thus, the output of the high speed divider 130 is a unique function of only the spot position on the graded filter 114. Accordingly, with this arrangement, light intensity fluctuations are completely cancelled out, making this detector arrangement sensitive only to the clearance between the blade and stationary member.

For some applications, it may be desirable to provide the capability to change the range of the optical probe 14 or 14'. This ability to change range, i.e., to change the region over which the probe 14 or 14' is capable of making measurements, has several advantages. For example, the range of the receiver or detector system may be reduced, bringing about an improvement in resolution. Also, different final mechanical installations, such as the ones caused by ordinary manufacturing tolerances, may be more easily accommodated. One means by which such probe range change may be accomplished is shown in FIG. 7 as a translating actuator 132. The actuator 132 functions to adjust the positioning of the fiber optic output cables 106A-D with respect to the graded filter 114 and photomultiplier 118. The translating actuator 132 may include a display showing its position. Another means by which the probe range may be changed is through the inclusion of alternate single-optical fibers 102A, 102B, 102C, and 102D, as partially shown in FIG. 6. The alternate fibers 102A-D may be equally spaced from the primary single fiber 102 and in one plane, i.e., the plane of the drawing. To effect a range change, the laser 104 output may be switched from the primary optical fiber 102 to one of the alternate fibers. Although four alternate fibers are shown in FIG. 6, any number and/or spacing may be used to effect the repositioning of range needed.

Figure 8:
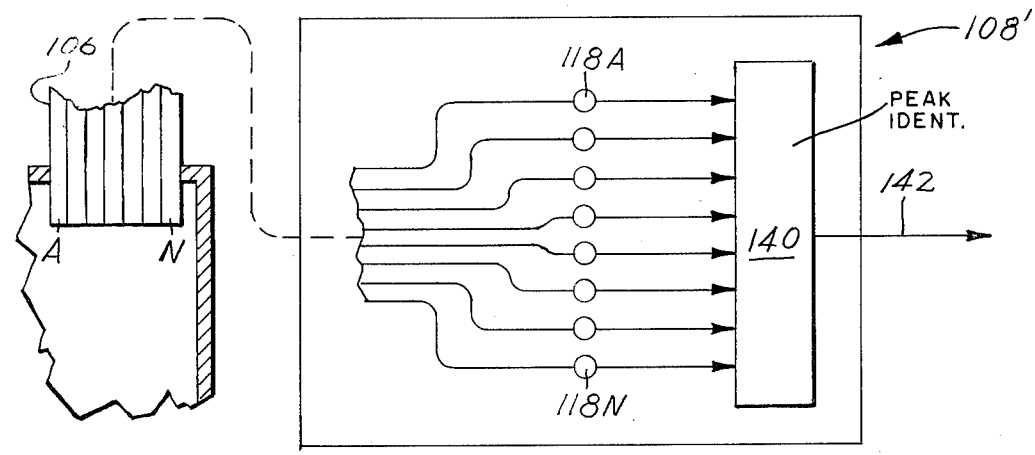
FIGS. 8 and 9 are schematic representations showing other signal processing means suitable for use with the apparatus of FIG. 6 which are especially suitable for use in developing a digital output signal.
Figure 9:
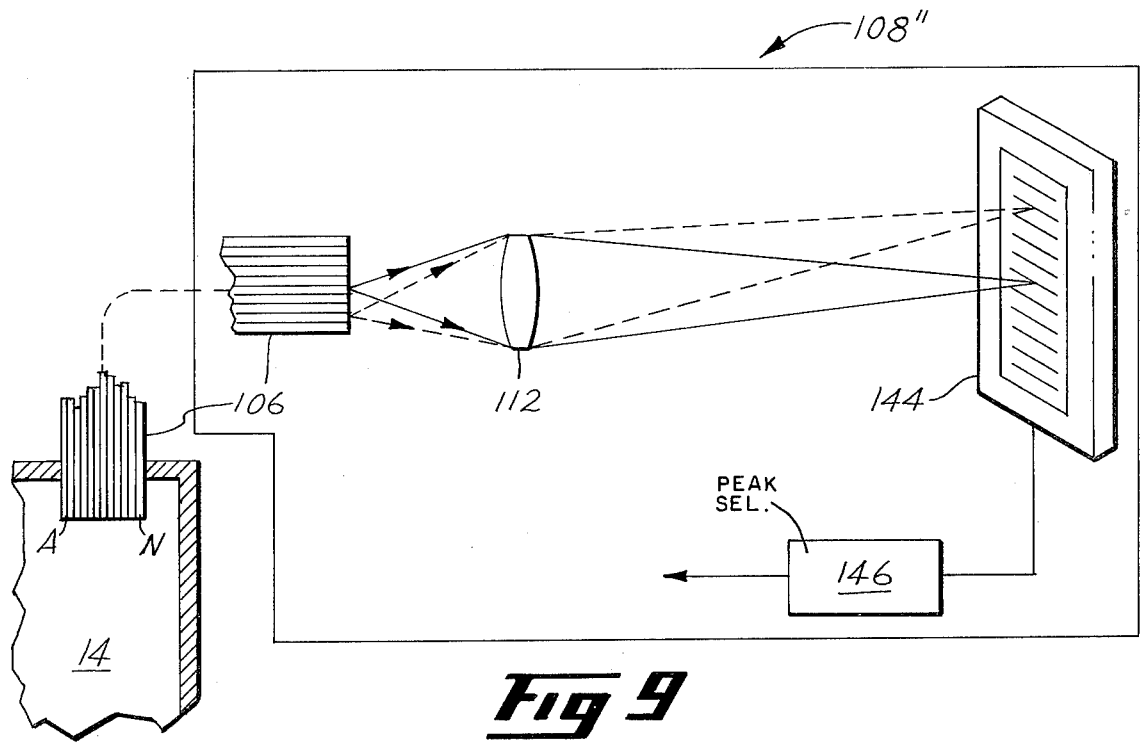

Another form of Applicant's invention in which optical fibers are employed is partially shown in FIG. 8. The signal processing means 108' of FIG. 8 is particularly suitable for use in developing a digital output representative of the clearance d. In FIG. 8, the signal processing means 108' employs a fanned-out coherent output fiber array 106, including individual fiber optics 106A-N. Each of the fiber optic cables 106A-N is coupled to a discrete detector 118A-118N. The outputs of each of the detectors 118A-N are coupled to electronic scanner and peak identifying module 140 which functions to develop an output 142 in the form of a digital signal representing position of the peak, and hence, the clearance d. Another form of signal processing for digital applications is shown in FIG. 9 and is generally designated 108''. In the signal processing means 108'', the fanned fiber array 106A-N is coupled to a lens 112 which focuses the light output therefrom onto a self-scanned sensor array 114. The self-scanned sensor array 144 may comprise the one designated CCPD series, commercially available from Reticon Co. The output of the self-scanned array 144 is coupled to a peak selector 146 which develops an output representative of the position of peach peak, and hence, the clearance d. The peak selector 146 may comprise the one designated SN7400 series, commercially available from Texas Instruments.

The apparatus and techniques of the present invention may be employed for many applications. For example, the invention is generally applicable to noncontact clearance, i.e., distance, measuring devices which use optical principles. The invention is particularly desirable in that it provides a representation, e.g., stored or displayed, of the instantaneous clearance between individual blades and the stationary member. In this connection, it is to be appreciated that the invention responds to each successive individual blade. By the instantaneous clearance of the present invention, it is meant the actual clearance between a particular blade edge and the stationary member at substantially the same time at which the blade is passing the stationary member. The invention is particularly suitable for use in connection with gas turbine engines. For example, the apparatus and techniques of the present invention may be employed for blade clearance sensing during operation of the compressor, fan or turbine blades of any gas turbine engine. In this connection, an important application of the apparatus and techniques of the present invention is for control purposes on gas turbine engines having active clearance control systems. The clearance signal developed may also be employed for recording and/or testing purposes, on developmental engines.

While the present invention has been described with reference to specific embodiments thereof, it will be obvious to those skilled in the art that various changes and modifications may be made without departing from the invention in its broader aspects. It is contemplated in the appended claims to cover all such variations and modifications of the invention which come within the true spirit and scope of my invention.

What is claimed as new and desired to be secured by Letters Patent of the United States is:

1. Apparatus for optically determining the clearance between the radial edge of at least one rotating blade member and a relatively stationary second member, which comprises:
   (a) probe means adapted to be disposed in relatively fixed position with respect to said stationary second member for directing input light from an intermittent light source to said radial edge and for collecting output light scattered back from said radial edge, said probe means including probe output means responsive to the output light scattered back for developing a probe output signal; and
   (b) signal processing means coupled to said probe output means for receiving said probe output signal and developing an intermediate electrical signal substantially representative of the instantaneous clearance between said radial edge and said second member, said signal processing means including synchronization means employing said intermittent light source for providing the presence of said input light at the time at which the clearance between said radial edge and said member is to be determined.

2. Apparatus in accordance with claim 1 including representation means responsive to said intermediate signal to provide a representation of said clearance.

3. Apparatus in accordance with claim 1 in which said probe output means comprises a spot position detector and wherein said probe output means develops a probe output signal having various values thereof with each of said various values representing a particular point of impact thereby representing a predetermined magnitude of said clearance.

4. Apparatus in accordance with claim 2 in which said representation means comprises means repeatedly triggered by an input signal representative of a complete revolution of the one rotating blade member.

5. Apparatus in accordance with claim 2 in which said representation means comprises display means.

6. Apparatus in accordance with claim 2 in which said representation means comprises storage means.

7. Apparatus in accordance with claim 1 in which said probe means is in fixed position with respect to a gas turbine engine having a plurality of rotating blades and in which said intermediate signal of (b) is representative of the instantaneous clearance between each of the plurality of radial edges and said stationary member.

8. Apparatus in accordance with claim 1 in which said probe means is adapted to be in fixed relation with respect to a gas turbine engine having a plurality of rotating blades and in which said synchronization means comprises:
   (a) first means for pulsing said light source to generate a series of relatively closely spaced search pulses;
   (b) second means for pulsing said light source to generate at least one measurement pulse wherein the measurement pulse is of greater magnitude and duration with respect to each of said search pulses; and
   (c) timer and control means for selectively activating said first and second means for:
      (1) initiating a first full series of said search pulses and initiating a first timing function when a first one of said rotating blades scatters light to said probe means;
      (2) stopping the development of said first series of pulses and said first timing function, determining the first time elapsed, and initiating a second timing function when a second consecutive one of said rotating blades scatters light to said probe means;
      (3) re-initiating a second partial series of said search pulses after a time period representative of a predetermined portion of the first time period,
      (4) generating said measurement pulse, stopping the development of said second series of search pulses and said second timing function, determining the second time elapsed, and initiating a third timing function when a third consecutive one of said rotating blades scatters light to said probe means; and
      (5) re-initiating a third partial series of said search pulses after a time period representative of a predetermined portion of the second time period.

9. Apparatus in accordance with claim 8 in which said signal processing means includes means for discriminating between an output beam produced by said search pulse and an output beam produced by said measurement pulse.

10. In a method for optically determining the clearance between a radial edge of at least one rotating blade member and a relatively stationary second member wherein an optical probe is activated intermittently, a method for synchronizing the activation of the probe with the presence of appropriate ones of the radial edges, comprising the steps of
    (a) initiating a first full series of relatively closely spaced search pulses and initiating a first timing function when a first one of said rotating blades scatters light to the probe;
    (b) stopping the development of said first series of search pulses and said first timing function, determining the first time elapsed, and initiating a second timing function when a second consecutive one of said rotating blades scatters light to said probe;

(c) re-initiating a second partial series of said search pulses after a time period representative of a predetermined portion of the first time period;

(d) generating a relatively greater magnitude measurement pulse, stopping the development of said second series of search pulses and said second timing function, determining the second time elapsed, and initiating a third timing function when a third consecutive one of said rotating blades scatters light to said probe; and then (e) re-initiating a third partial series of said search pulses after a time period representative of a predetermined portion of the second time period.

11. In apparatus for optically determining the clearance between a radial edge of at least one rotating blade member and a relatively stationary second member wherein an optical probe is activated intermittently, means for synchronizing the activation of the probe with the presence of appropriate ones of the radial edges, comprising (a) means for initiating a first full series of relatively closely spaced search pulses and initiating a first timing function when a first one of said rotating blades scatters light to the probe;

(b) means for stopping the development of said first series of search pulses and said first timing function, determining the first time elapsed, and initiating a second timing function when a second consecutive one of said rotating blades scatters light to said probe;

(c) means for re-initiating a second partial series of said search pulses after a time period representative of a predetermined portion of the first time period;

(d) means for generating a relatively greater magnitude measurement pulse, stopping the development of said second series of search pulses and said second timing function, determining the second time elapsed, and initiating a third timing function when a third consecutive one of said rotating blades scatters light to said probe; and (e) means for re-initiating a third partial series of said search pulses after a time period representative of a predetermined portion of the second time period.

12. Apparatus in accordance with claim 11 in which said probe means is in fixed relation with respect to a gas turbine engine having a plurality of rotating blades.

* * * * *